Patented Oct. 24, 1939

2,176,877

UNITED STATES PATENT OFFICE 2,176,877

METHOD FOR THE PREPARATION OF COMPOSITE PIGMENTS

Hugh V. Alessandroni, New York, N. Y., assignor, by mesne assignments, to National Lead Company, New York, N. Y., a corporation of New Jersey No Drawing. Original application August 24, 1935, Serial No. 37,775. Divided and this application November 8, 1938, Serial No. 239,512

9 Claims. (Cl. 134—58)

My invention relates to novel methods for the manufacture of pigments, particularly to the manufacture of that type of pigment known as "composite" in which a primary pigment is intimately associated with one or more secondary pigments.

The objects of my invention include novel methods of the manufacture of composite pigments which methods possess many advantages over those of the prior art.

The present application is a division of my copending application, Serial No. 37,775, filed August 24, 1935, Patent No. 2,176,875, issued October 24, 1939.

Pigments are said to be of the composite type when they consist of two or more individual components. Thus, lithopone, a zinc sulfide-barium sulfate composition, is a composite pigment. So also are the well-known, so-called coalesced composite titanium dioxide pigments of the prior art in which there is present beside titanium dioxide, either barium or calcium sulfate. Titanated lithopone, a tertiary pigment composed of titanium dioxide, zinc sulfide and barium sulfate is also of the composite type. In all composite pigments there is present at least one material which may be regarded as the primary pigment. Such a material possesses relatively good pigment properties such as, for example, tinting strength hiding power, opacity, etc. In addition to the primary pigment there is also present in composite pigments at least one other material which may be regarded as a secondary pigment. Such a material possesses pigment properties relatively inferior to those of the primary pigment. In composite pigments the function of the secondary pigment is referred to as that of an "extender", a "carrier" or "diluent" for the primary pigment, although, in the present invention, the secondary pigment may itself possess definite pigment properties.

By "primary pigment" as used by me to designate a component of a composite pigment prepared according to the herein described method, I refer to that component which possesses superior pigment properties as compared with the other component or components of the composite pigment and which, whether it be a simple or composite material, is dispersed as a simple material in one suspension. Thus, the primary pigment component may consist of a simple material such as titanium dioxide, zinc sulfide, or it may consist of a coprecipitated composite pigment prepared by prior art methods, such as titanium dioxide-barium sulfate pigment. In this latter example the coprecipitated calcined composite titanium dioxide-barium sulfate pigment is to be considered as the primary pigment since it possesses pigment properties superior to those of the basic lead carbonate. Conversely, "secondary pigment" as used by me indicates the component or components of a composite pigment prepared according to the present invention which possesses pigment properties inferior to those possessed by the primary pigment constituent. The term "secondary pigment" as used by me would thus include not only the so-called extenders, e. g. barium sulfate, calcium sulfate, asbestine, etc., but also certain other materials possessing relatively good pigment properties, e. g. basic lead carbonate, zinc oxide, etc., when these latter are used in conjunction with a material having even better pigment properties as, for example, titanium dioxide, zinc sulfide, etc.

For the most part, composite pigments have been prepared in the past by methods which involve a coprecipitation of the primary and secondary pigments and a subsequent mutual calcination. Lithopone, for example, is prepared by a double decomposition reaction which occurs when solutions of zinc sulfate and barium sulfide are brought together. The resulting precipitate of zinc sulfide and barium sulfate is then calcined. Composite titanium dioxide pigments are generally prepared by one of two alternative procedures: (1) By adding the secondary pigment, e. g., barium or calcium sulfate, to a titanium solution and precipitating the titanium-oxygen compounds by hydrolysis; or, (2) by adding a solution of a salt, the sulfate of which constitutes the secondary pigment, e. g. calcium or barium chloride, to a titanium sulfate solution thus forming the secondary pigment, in situ, and then precipitating the titanium-oxygen compounds by hydrolysis. The mixed precipitates of titanium-oxygen compounds and secondary pigment are then calcined together. Such methods produce pigments concerning which it has been said that the titanium dioxide is precipitated on and coalesced with the secondary pigment.

Among the reasons for this final or penultimate calcination step may be mentioned the following: (a) to effect changes primarily in the crystalline structure of certain of the components of the pigment; (b) to effect or complete a coalescence between the primary and secondary constituents of the composite pigment; (c) to dehydrate one or more of the constituents, if they exist in the coprecipitated mixture as hydroxides or hydrates, etc.; (d) to eliminate volatile impurities.

As a result of this calcination, the pigment properties of the primary pigment, such as tinting strength, covering power, etc., are developed to an optimum degree. The secondary pigment, on the other hand, is essentially unaltered and unimproved. It is evident, therefore, that the prior art methods involve considerable unnecessary treatment of the secondary pigment and, as a consequence of this unnecessary treatment, increased manufacturing costs.

I have now discovered novel methods whereby composite pigments such as those comprising a primary pigment and one or more secondary pigments may be prepared without the necessity of resorting to coprecipitation and mutual calcination. My novel methods are particularly suited to the preparation of composite pigments superior to those manufactured by prior art methods and at a much lower cost of production. These novel methods comprise the coflocculation of a mixture consisting of a dispersed suspension of a primary pigment and separately dispersed suspensions of one or more secondary pigments after which the coflocculated composite pigment is washed, dried and pulverized.

By the term "coflocculation" as used by me throughout this description of my invention, I mean the mutual coagulation and integration of pigment particles from a mixture consisting of a dispersed aqueous suspension of a primary pigment and one or more separately-dispersed aqueous suspensions of secondary pigments.

My novel coflocculation methods of preparing composite pigments are clearly distinguishable from prior art precipitation methods for preparing composite pigments.

In methods involving precipitation, substances in substantially molecular solution undergo, under suitable conditions, physico-chemical changes which result in the formation of a second, usually difficultly soluble, phase. Flocculation, on the other hand, involves only the integration or coagulation of small particles of a dispersed substance to larger particles or flocs. In the former phenomenon the molecules are said to be condensed to minute ultra-microscopic crystals from which in turn larger particles are developed by what is known as "grain-growth". In the latter phenomenon particles which may even be so small as to approach colloidal dimension are integrated to larger, visible microscopic flocs. In the former the larger particles result from a physico-chemical interaction between the ultramicroscopic crystals and the surrounding solution while in the latter the larger particles result merely from an integration and adherence of a number of smaller particles. Whereas, precipitation implies the transition of substances from the solution phase, through the colloidal phase to the solid phase; flocculation, as used by me, implies merely an agglomeration of small particles to form larger ones.

Hydrolysis, with the formation of hydrous oxides, and double decomposition or metathesis, with the formation of insoluble salts, are typical condensation reactions involving precipitation. Thus, for example, hydrous titanium oxide is formed by hydrolysis of a titanyl sulfate solution while barium sulfate is formed by a double decomposition reaction between a solution of a soluble barium compound and a solution of a soluble sulfate.

In practicing my invention, a dispersed suspension of the primary pigment is first prepared by means of a dispersing agent. Separate individual suspensions of the secondary pigment or pigments are prepared, also by means of dispersing agents. These suspensions are then mixed and coflocculation accomplished by one of two procedures: (1) by means of an added coagulating agent; (2) as a result of an interaction between the dispersing agent selected for the primary pigment and the dispersing agent or agents selected for the secondary pigment or pigments.

The dispersion of the primary and secondary pigments may conveniently be effected by grinding or milling the individual pigment with a suitable quantity of water, for example, a quantity equal in weight to that of the pigment. The dispersing agent may be contained in the water, either in solution if it be water-soluble, or in suspension, if it be insoluble in water; or it may be added prior to or during the milling or grinding operation, as desired.

The function of a dispersing agent is not completely understood. It is believed that the disintegration of aggregates of primary particles which results from the use of a suitable dispersing agent is due to a strong, usually preferential absorption of ions. It has been suggested that through the use of such an agent a similar electrical charge is impinged upon the individual particles of the dispersed or suspended substance, the effect of which is to set up a mutual repulsion between the individual particles, thus preventing coagulation. Furthermore, a dispersing agent may effect a reduction in the size of the particles of a dispersed or suspended material by partially dissolving them. A substance may also function as a dispersing agent, although with obvious limited application, if it succeeds in nullifying or destroying the agglomerating effect of some other substance present in the material.

Although these general hypotheses are not conclusive, they furnish, in many instances, a guide to the proper selection of the dispersing agents to be employed in the practice of my invention.

Among the materials which exert a dispersing effect on various primary and secondary pigments and which are, therefore, useful in the practice of my invention may be mentioned: the carbonates and hydroxides of alkali metals, e. g. NaOH, $Na_2CO_3$, $K_2CO_3$; ammonium hydroxide, $NH_4OH$; alkali metal silicates, e. g. $Na_2SiO_3$; sulfides, e. g. $H_2S$, certain inorganic salts, e. g. $PbCl_2$ and $BaCl_2$; acidic halides of tri- and tetravalent elements, e. g. Fe Th, Tl, Ce, Al, Ti, Zr, etc.; metallic soaps, e. g. those of oleic, stearic, palmitic or lauric acid; the ammonium soaps of sulfonated aliphatic oils, e. g. the ammonium soap of sulfonated castor oil; sulfonated fatty oils or acids, e. g. Turkey red oil; alkyl- substituted aryl sulfonic acids and their salts, e. g. isopropyl- naphthalene sulfonic acid and the sodium salt thereof; certain emulsifying agents such as saponin, trihydroxyethylamine, etc.

According to the first alternative method of my invention, any suitable dispersing agents may be employed in preparing the dispersed suspension of primary pigment and that of the secondary pigment or pigments, and coflocculation may be brought about by the addition, to the mixed suspensions, of a coagulating agent, for example, magnesium sulfate. Strongly acidic or basic substances such as sulfuric acid or sodium hyroxide are often effective as coagulating agents.

It will be readily seen that the selection of a suitable coagulating agent will be determined largely from a consideration of the factors involved in preparing the dispersed suspensions. When added to the mixed suspensions which are in a stable condition, it should function in a manner similar to that of an antipathetic dispersing agent, i. e. neutralize or discharge the stabilizing influences of the dispersing agents contained in the mixed suspensions. The most effective coagulating agents are electrolytes and as such furnish in solution two types of ions: (a) one which may be adsorbed and cause dispersion and (b) one which tends to neutralize or discharge the dispersing ion and cause flocculation. When dispersed pigment articles are coflocculated from mixed suspensions by means of a coagulating agent which is an electrolyte, the flocculating power of that electrolyte may be considered as that concentration which furnishes a sufficient quantity of those ions which tend to neutralize not only the original stabilizing ions of the dispersing agents but also those of the electrolyte itself.

Therefore an electrolyte with a strongly adsorbable dispersing or stabilizing ion will necessarily require higher concentration in order to effect coflocculation than an electrolyte with a weakly adsorbable stabilizing or dispersing ion.

Briefly stated, a coagulating agent should have a stabilizing ion which is only slightly adsorbable; that is, the influence of the ion having the same charge as that impinged upon the particles of the dispersed substances should be small, whereas that of the flocculating or opposite ion should be great.

Although these considerations are useful in selecting coagulating agents and, to a certain extent, antipathetic dispersing agents for the practice of my invention I do not limit myself only to coagulating agents or antipathetic dispersing agents selected in accordance therewith.

The second of the two above noted methods of carrying out my invention is to choose the dispersing agents for the primary pigment and secondary pigment or pigments respectively, so that mutual coflocculation occurs without the aid of a coagulating agent when the suspensions containing these dispersing agents are mixed together. Properly chosen dispersing agents will, when suspensions containing them are mixed together, nullify or mutually counteract the dispersing effect of each other and may be referred to as being antagonistic or antipathetic to each other.

It is practically impossible to list all the combinations of dispersing agents which may be employed in carrying out my invention according to this method. Certain considerations are, however, helpful in arriving at a proper selection of antipathetic dispersing agents, for example, where a dispersion has been prepared by means of a dispersing agent furnishing preferentially adsorbed ions, an antipathetic dispersing agent will furnish ions capable of neutralizing or discharging the dispersing ions of the first dispersing agent. The ions of the antipathetic dispersing agent which fulfill this function are usually of opposite electrical potential. Consequently, acidic dispersing agents may be regarded as being antipathetic to basic dispersing agents and vice versa. For example, a mutual coflocculation will result when a suspension of titanium dioxide, prepared by means of the acidic salt, aluminum chloride, is mixed with a suspension of barium sulfate prepared with the basic substance, sodium silicate.

In general, as will be readily ascertained from this description of my invention and particularly from the specific embodiments thereof, dispersion of the primary or secondary pigments may be effected by the use of only a small amount of dispersing agent. When it is desired to bring about the coflocculation of the composite pigments as a result of neutralizing or antipathetic properties of the respective dispersing agents, it may be advantageous to use substantially stoichiometric proportions of the agents selected. However, if it be desired to coflocculate by means of a coagulant such consideration is not important.

After the pigment particles have been coflocculated from the mixed suspensions they may be separated from the supernatant liquor by any suitable means such as decantation or filtration or both. The dispersing agents as well as the coagulating agents are thus practically completely removed. The coflocculated pigment particles may then be washed to remove any residual soluble dispersing agent, coagulating agent, or reaction products resulting from an interaction between antipathetic dispersing agents, and then dried. In those cases where an insoluble dispersing agent had been used the small amount remaining in the pigment after removal of the supernatant liquor and washing will exert no detrimental effect on the quality of the product. When dried, coflocculated pigments prepared according to the methods of the present invention may be readily pulverized in order to render them suitable for use in the industrial arts.

There is obtained, as a result of my novel coflocculation processes, an integration of particles of the primary and secondary pigments originally dispersed in which the particles are intimately associated in such relationship that, after washing, drying and pulverizing, they possess pigment properties which are comparable to those possessed by the coalesced composite pigments of the prior art. There is involved, I believe, in the integration resulting from my coflocculation processes an association as intimate and/or an affinity between the primary pigment particles and those of the secondary pigment or pigments which is at least as strong as that resulting from the coprecipitation and conjoint calcination methods of the prior art for the preparation of the so-called coalesced composite pigments. For these reasons I employ the term "integrated" as descriptive of the association of pigment particles coflocculated as above described.

This application as filed is a division of my application, Serial No. 37,775, filed August 24, 1935, Patent No. 2,176,875, issued October 24, 1939 I have broadly claimed herein the second method above set forth wherein antipathetic dispersing agents are employed for the primary and secondary pigments respectively, and in which coflocculation of the dispersed pigment particles takes place upon simply mixing the dispersed suspensions. In addition to the broad claims to this process specific claims are included to the use of titanium dioxide, composite titanium dioxide pigments, and zinc sulfide as the primary pigments and barium sulfate, calcium sulfate, and basic carbonate white lead as the secondary pigments, to aluminum chloride, sodium silicate and hydrogen sulfide as dispersing agents, all as will appear in the claims hereof.

In said original application, Serial No. 37,775, filed August 24, 1935, Patent No. 2,176,875, issued October 24, 1939 I have broadly claimed the first of the two methods above described wherein dispersing agents are employed which are not antipathetic to one another and in which a coagulating agent is used for effecting coflocculation of the dispersed pigment particles. In addition to the broad claims to this process specific claims are included to the use of titanium dioxide and composite titanium dioxide pigments as the primary pigments and barium sulfate and basic carbonate white lead as the secondary pigments, to sodium silicate and lead chloride as dispersing agents, and to magnesium sulfate as the coagulating agent, all as will appear in the claims thereof.

Application, Serial No. 239,511, filed Nov. 8, 1938, Patent No. 2,176,876, issued October 24, 1939, comprises another divisional application of the said original application, Serial No. 37,775, filed August 24, 1935, Patent No. 2,176,876, issued October 24, 1939, and in that divisional application the claims are restricted to the first method above set forth wherein zinc sulfide is employed as the primary pigment with claims specific thereto, in which the secondary pigment is barium sulfate, sodium silicate is the dispersing agent and magnesium sulfate is the cogulating agent.

It is to be specifically understood that no abandonment of any of the claims not presented in the original application, Serial No. 37,775, Patent No. 2,176,875, issued October 24, 1939 or in this, or the other divisional application above set forth is to be incurred by the order in which the Letters Patent hereon and on the said two divisional applications may issue or by the fact that all of the claims are not presented in a single patent, reservation being hereby specifically made to present the claims in this and the two other applications as just above set forth.

In this application, with the understanding and reservation as above set forth, I now present specific examples of carrying out the process as herein above described. It will be further understood, of course, that my invention is not in any way to be restricted to these specific examples as below given which are for illustrative, but not limitative, purposes.

Example 1

Titanium dioxide-barium sulfate composite pigment

A suitable titanium dioxide pigment is that which is obtainable in anhydrous, crystalline condition prepared, for example, according to U. S. Patents Nos. 1,288,863; 1,333,819 and 1,348,129. It may contain phosphorous compounds as described in U. S. Patent No. 1,412,027. Natural barytes which has been ground, purified, bleached and elutriated, thus assuring uniformity and fineness, is a satisfactory source for the barium sulfate. On the other hand, a blanc fixe having the same characteristics as the ground, purified and elutriated barytes may also be used.

100 lbs. of the above described titanium dioxide pigment are milled in a suitable mill such as a porcelain ball-mill for about 2 hours with substantially an equal weight of water and about 1% of its weight of aluminum chloride. 300 lbs. of barium sulfate, $BaSO_4$, either ground natural barytes or blanc fixe, selected as above described are milled in a similar manner for about 2 hours with about an equal weight of water and about ½ to ¾ per cent of sodium silicate, preferably of a ratio $Na_2O$ to $SiO_2$ of 1:4.

The two suspensions are then mixed in a suitable tank. Mutual coflocculation results through interaction of the aluminum chloride and sodium silicate. The coflocculated integrated pigment particles are then separated from the supernatant liquor, washed and dried, preferably at a temperature between 100°–120° C. After drying, the composite pigment is easily pulverized.

The pigment thus prepared is a composite consisting of approximately 25 parts of titanium dioxide and 75 parts of barium sulfate.

Example 2

Zinc sulfide-barium sulfate pigment 100 lbs. of commercial zinc sulfide pigment are milled for about 2 hours with about 35 gallons of water saturated with hydrogen sulfide, $H_2S$. 233 lbs. of barium sulfate similar to that employed in Example No. 1 are separately dispersed by milling for about 2 hours in 33 gallons of water in the presence of 2.66 lbs. of sodium silicate.

When the two solutions are mixed together coflocculation of the dispersed pigment particles occurs without the necessity of employing a coagulating agent.

The coflocculated pigment particles are filtered, washed and dried at about 100° C., after which a pulverization may be employed.

Example 3

Titanium dioxide-barium sulfate-basic lead carbonate composite pigment

The primary pigment selected for this example was coreciprocated, mutually calcined composite titanium dioxide-barium sulfated pigment. The basic lead carbonate was obtained according to the well-known Dutch process corrosion of lead by acetic acid in the presence of decomposing organic matter.

100 lbs. of a composite pigment consisting of about 25% titanium dioxide and 75% barium sulfate was dispersed in 100 gallons of water by milling for about 2 hours in the presence of 0.5 lb. of sodium silicate. 100 lbs. of basic lead carbonate are separately dispersed in 100 gallons of water by milling for 2 hours in the presence of 1.5 lbs. of lead chloride, $PbCl_2$.

Coflocculation will result without the aid of a coagulating agent when the two suspensions are mixed. The coflocculated pigments are filtered, washed, dried at about 110° C., and pulverized.

It will be seen that my methods are admirably suited to the preparation of pigments of any desired predetermined proportions. In determining the desired proportions of primary and secondary pigments the use to which the composite pigment is to be put should be taken into consideration. If the requirements are such as to demand a pigment having a high tinting strength, good opacity, etc., a relatively larger amount of primary pigment will be used.

Furthermore, my coflocculation methods are not limited to the preparation of white composite pigments but are excellently adapted for the preparation of colored composite pigments. It is accordingly possible to prepare a pigment consisting of two or more colored pigments of any desired color or tint, and it is equally possible to tint a white pigment with any desired tint. For example, if a dispersion of chrome yellow (a lead chromate-lead sulfate pigment) be prepared and also one of Prussian blue (a ferric ferro cyanide) there will result on coflocculation a green pigment of any desired shade depending on the relative proportions of chrome yellow and Prussian blue used. Thus, also, for example, a titanium dioxide pigment may be tinted a buff or light green or any other desired tint by subjecting it to a coflocculation process together with the desired quantity of a buff, or green, or other desired toner. Colored pigments prepared according to my coflocculation methods are outstanding for their evenness of color and tone and when incorporated with vehicles to prepare surface coatings spread out without streaks or unevenness of color. Their uniform color renders them advantageous for use in other industrial arts as well.

Composite pigments prepared according to my coflocculation methods are preeminently adapted for use in surface coatings such as paints, enamels and lacquers. They are equally well adapted for the manufacture of opaque white or colored paper either by adding them to the paper as a beater addition or in other suitable ways. They are also useful in the manufacture of rubber goods such as white side walls for pneumatic tires, white or colored dress shields, bath curtains, overshoes, raincoats, and the like. In general they are excellently suited for use wherever a high quality white or colored pigment of great uniformity is required.

The foregoing detailed description has been given for clearness of understanding and no undue limitations should be deduced therefrom, but the appended claims should be construed as broadly as possible in view of the prior art.

I claim:

1. A process for the manufacture of a composite pigment, which comprises dispersing a primary pigment in aqueous suspension by means of a small amount of a dispersing agent, separately dispersing a secondary pigment in aqueous suspension by means of a small amount of a dispersing agent antipathetic to the dispersing agent for said primary pigment and coflocculating the dispersed pigments by mixing the separately dispersed suspension, separating the coflocculated pigments thus integrated from the supernatant liquor, and washing, drying and pulverizing the same.

2. A process for the manufacture of a composite pigment, which comprises dispersing a primary pigment in aqueous suspension by means of a small amount of a dispersing agent, separately dispersing a plurality of secondary pigments in aqueous suspension by means of small amounts of dispersing agents at least one of which is antipathetic to the dispersing agent for said primary pigment and coflocculating the dispersed pigments by mixing the separately dispersed suspensions, separating the coflocculated pigments thus integrated from the supernatant liquor, and washing, drying and pulverizing the same.

3. A process for the manufacture of a composite titanium dioxide pigment, which comprises dispersing calcined titanium dioxide pigment in aqueous suspension by means of a small amount of a dispersing agent, separately dispersing a secondary pigment in aqueous suspension by means of a small amount of a dispersing agent antipathetic to the dispersing agent of the said titanium dioxide, coflocculating the dispersed pigments by mixing the separately dispersed suspensions, separating the coflocculated pigment thus integrated from the supernatant liquor, and washing, drying and pulverizing the same.

4. A process for the manufacture of a composite titanium dioxide-barium sulphate pigment, which comprises dispersing calcined titanium dioxide pigment in aqueous suspension by means of a small amount of a dispersing agent, separately dispersing barium sulphate in aqueous suspension by means of a small amount of a dispersing agent antipathetic to the dispersing agent of the titanium dioxide, coflocculating the dispersed pigments by mixing the separately dispersed suspension, separating the coflocculated pigments thus integrated from the supernatant liquor, and washing, drying and pulverizing the same.

5. A process for the manufacture of a composite titanium dioxide-barium sulphate pigment, which comprises dispersing calcined titanium dioxide pigment in aqueous suspension by means of a small amount of aluminum chloride separately dispersing barium sulphate in aqueous suspension by means of a small amount of sodium silicate, mixing the two suspensions, separating the coflocculated pigments thus integrated from the supernatant liquor, and washing, drying and pulverizing the same.

6. A process for the manufacture of a zinc sulphide pigment, which comprises dispersing zinc sulphide in aqueous suspension by means of a small amount of a dispersing agent, separately dispersing a secondary pigment in aqueous suspension by means of a small amount of a dispersing agent antipathetic to the dispersing agent for the zinc sulphide, coflocculating the dispersed pigments by mixing the separately dispersed suspensions, separating the coflocculated pigments thus integrated from the supernatant liquor, and washing, drying and pulverizing the same.

7. A process for the manufacture of a composite zinc sulphide-barium sulphate pigment, which comprises dispersing zinc sulphide in aqueous suspension by means of a small amount of a dispersing agent, separately dispersing barium sulphate by means of a small amount of a dispersing agent antipathetic to the dispersing agent of the zinc sulphide, coflocculating the dispersed pigment by mixing the separately dispersed suspension, separating the coflocculated pigments thus integrated from the supernatant liquor and washing, drying and pulverizing the same.

8. A process for the manufacture of a composite zinc sulphide-barium sulphate pigment, which comprises dispersing zinc sulphide by means of hydrogen sulphide, separately dispersing barium sulphate by means of a small amount of sodium silicate, coflocculating the dispersed pigments by mixing the separately dispersed suspensions, separating the coflocculated pigments thus integrated from the supernatant liquor, and washing, drying and pulverizing the same.

9. A process for the manufacture of a composite titanium dioxide-barium sulphate-basic lead carbonate pigment, which comprises dispersing a titanium dioxide-barium sulphate pigment of which the titanium dioxide pigment portion consists of calcined titanium dioxide pigment in aqueous suspension by means of a small amount of sodium silicate, separately dispersing basic lead carbonate in aqueous suspension by means of a small amount of lead chloride, coflocculating the dispersed pigments by mixing the separately dispersed suspension, separating the coflocculated pigments thus integrated from the supernatant liquor and washing, drying and pulverizing the same.

HUGH V. ALESSANDRONI.